Aug. 20, 1968     C. A. KUNISKIS     3,397,895
COMBINATION VEHICLE STABILIZER AND FORCE EQUALIZER
Filed March 9, 1967     2 Sheets-Sheet 1
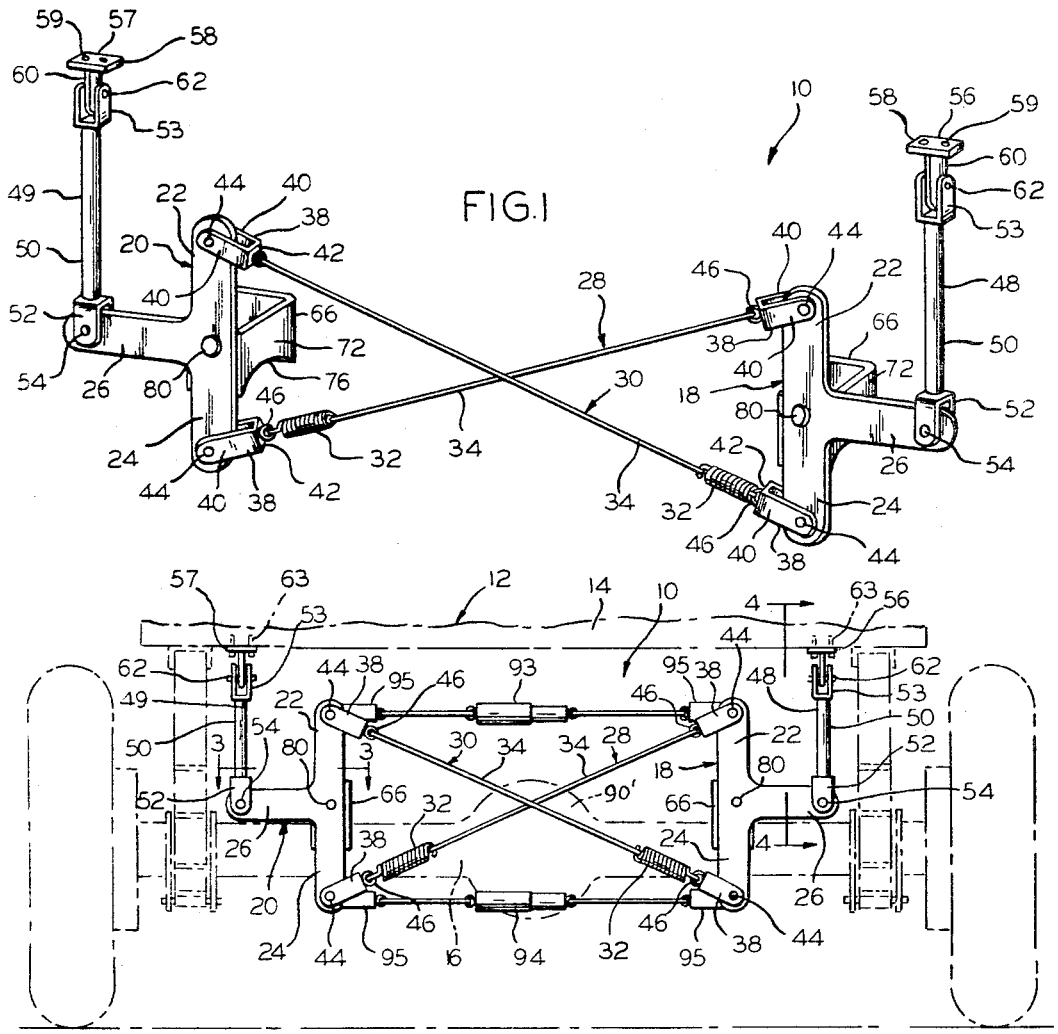
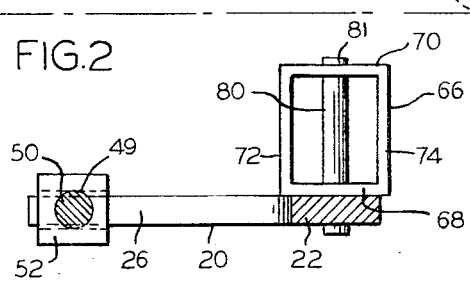
INVENTOR
CASEMIRO ALEXANDRE KUNISKIS
BY
*Eli Mullin*
ATTORNEY Aug. 20, 1968  C. A. KUNISKIS  3,397,895
COMBINATION VEHICLE STABILIZER AND FORCE EQUALIZER
Filed March 9, 1967  2 Sheets-Sheet 2
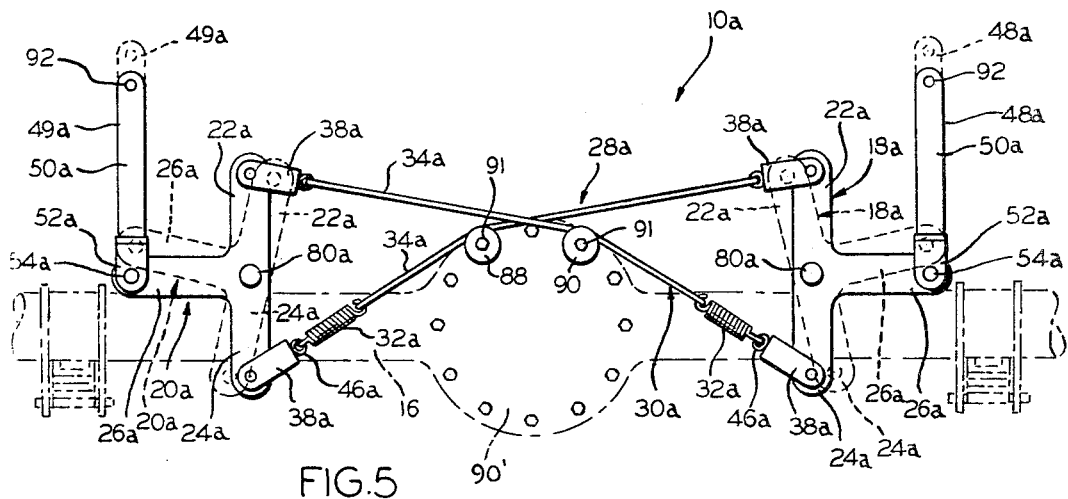
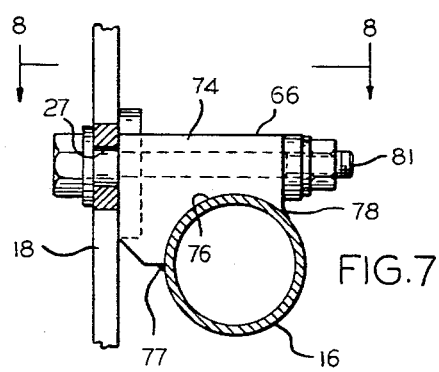
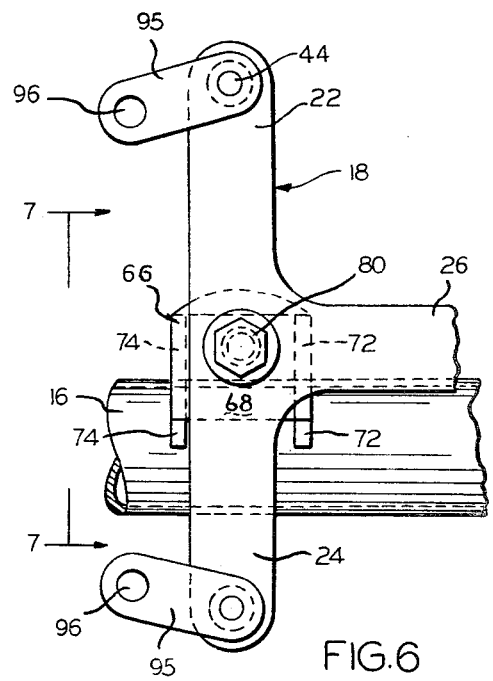
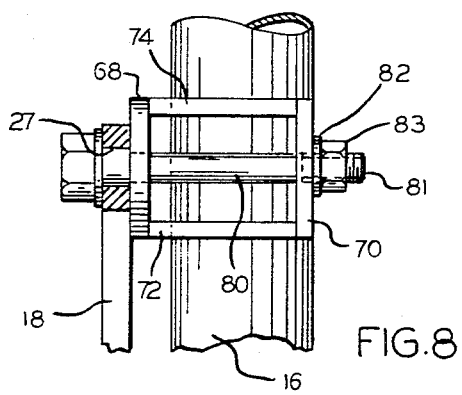
INVENTOR
CASEMIRO ALEXANDRE KUNISKIS
BY
Eli Mullin
ATTORNEY

United States Patent Office 3,397,895
Patented Aug. 20, 1968

3,397,895
COMBINATION VEHICLE STABILIZER
AND FORCE EQUALIZER
Casemiro Alexandre Kuniskis, 5206 S. Campbell St.,
Chicago, Ill. 60629
Filed Mar. 9, 1967, Ser. No. 621,967
7 Claims. (Cl. 280—6)

ABSTRACT OF THE DISCLOSURE

A device which automatically responds to the tendency of either side of a motor vehicle to sway up or down with respect to the opposite side thereof and applies a restraining force to counteract or neutralize the force causing said swaying tendency.

Background of the invention

This invention relates generally to a device for counteracting or neutralizing the forces acting on a motor vehicle and more particularly relates to a device for stabilizing an automobile whenever there is a tendency for either side of the rear end thereof to assume a different level than the opposite side, such as for example when driving over non-level roads or turning a sharp corner.

Various devices have been devised heretofore to neutralize or equalize the forces acting on a motor vehicle. However, these prior devices were generally used to distribute the forces away from a single area of concentration for the purpose of equalizing the load on the vehicle springs. Moreover, these prior devices were specifically constructed to equalize only downward acting forces. They were not capable of, nor were they intended to, equalize upward acting forces.

Furthermore, the prior force equalizers were not vehicle stabilizers. They afforded no counteracting force to maintain a vehicle in a stable position when one side of the vehicle was subjected to forces which tended to cause the vehicle to assume a different level with respect to the opposite side thereof. The vehicles heretofore generally relied upon spring action and shock absorbers to minimize the up and down movement of the vehicle but not to eliminate the same. The invention herein by means of a static force transmission system instantly applies a restraining force to counteract the tendency of one side of the vehicle to assume a different level than the opposite thereof, and thus prevents vehicle swaying before it starts.

Furthermore, the prior force equalizers afforded no safety device to return a vehicle to a stable position when, for example, one side thereof would actually lift away from the road during a sharp turn or while descending a winding road in mountainous terrain. Hence, the driver had to rely almost entirely on his skill and familiarity of the road. Consequently, accidents, some often fatal, occurred under these circumstances. To a large extent the present invention eliminates this hazard by automatically and instantly applying a counter-force to insure vehicle stability.

Summary of the invention

The device of this invention provides means for maintaining the stability of an automobile when one side tends to assume a different level than the opposite side thereof. Thus, when an imbalance of forces occur tending to cause the vehicle to sway, the invention herein instantly applies a restraining force to equalize the forces on both sides of the vehicle and thus prevents the same from oscillating or swaying.

Furthermore, if one side of the vehicle actually lifts off the road, as for example when making extremely sharp turns, the device herein instantly responds and applies a counteracting force which minimizes the vertical displacement and cooperates with the gravitational force to return the raised side to the road.

Furthermore, the device herein also affords means for equalizing the forces acting in a downward direction on the vehicle springs. Hence, if a concentration of forces tend to cause one side of the vehicle to tilt downward, the device instantly responds and applies a counteracting force to neutralize said concentration of forces. Thus, the device of this invention may function both as a force equalizer and a vehicle stabilizer. In effect, this also eliminates or minimizes "sway."

It is, therefore, a primary object of this invention to provide a device to automatically and instantly react to maintain the stability of a vehicle when either side thereof tends to assume a different level than the other side.

Another object is to provide a device to stabilize a motor vehicle when either side thereof lifts away from the road.

A further object is to afford a device to instantly react and apply a counter-force against the force tending to cause either side of a motor vehicle to assume a different level than the opposite side.

Still another object is to provide a safety device associated with the rear end of an automobile for stabilizing the same during sharp turns.

Yet a further object is to afford a safety device to minimize the swaying of a vehicle during travel.

Yet another object is to provide a safety device associated with the rear end of an automobile for stabilizing the same while travelling over transversely inclined road.

Still another object is to provide a device for applying a counter-force against one side of the vehicle to equalize a concentration of forces acting on the opposite side thereof.

Still another object is to provide a device capable of equalizing forces acting either in the downward or upward direction on the vehicle.

Still another object is to provide a device for maintaining the stability of a vehicle by providing a static transmission force system which instantly responds to prevent level variation of one side with respect to the opposite side.

A further object is to provide a device to stabilize a motor vehicle when either side thereof lifts away from the road.

With the foregoing and other objects in view which will appear as the description proceeds, the invention consists of certain novel features of construction, arrangement and a combination of parts hereinafter fully described, illustrated in the accompanying drawings, and particularly pointed out in the appended claims, it being understood that various changes in the form, proportion, size and minor details of the structure may be made without departing from the spirit or sacrificing any of the advantages of the invention.

Brief description of the drawings

For the purpose of facilitating an understanding of my invention, I have illustrated in the accompanying drawings a preferred embodiment thereof, from an inspection of which, when considered in connection with the following description, my invention, its mode of construction, assembly and operation, and many of its advantages should be readily understood and appreciated.

Referring to the drawings in which the same characters of reference are employed to indicate corresponding or similar parts throughout the several figures of the drawings:

FIG. 1 is a perspective elevational view of a combination vehicle stabilizer and force equalizer embodying the principles of this invention;

FIG. 2 is a front elevational view of the stabilizer in FIG. 1 mounted on the rear end of the vehicle and showing the same having a pair of tensioning means functioning as shock absorbers;

FIG. 3 is an enlarged sectional view taken on the plane of the line 3—3 in FIG. 2 and viewed in the direction indicated;

FIG. 4 is an enlarged sectional view taken on the plane of the line 4—4 in FIG. 2, viewed in the direction indicated with portions broken away to facilitate illustration, and showing the component parts for pivotally associating the arm member with the T-plate and the vehicle frame;

FIG. 5 is a front elevational view of another embodiment of the invention showing in dotted outline the change in position of the main component parts when there is a variation in the level of one side of the vehicle with respect to the opposite side thereof;

FIG. 6 is a fragmentary enlarged front view illustrating the component parts for supporting the T-plate on the rear axle of the vehicle;

FIG. 7 is a fragmentary view taken on the plane of the line 7—7 in FIG. 6 viewed in the direction indicated, and showing the association of the saddle member on the axle; and FIG. 8 is a fragmentary view taken on the plane of the line 8—8 in FIG. 7, and viewed in the direction indicated.

Referring now more particularly to FIGS. 1 and 2 of the drawings, the reference numeral 10 indicates generally a device for stabilizing or equalizing the forces acting on the rear end of a motor vehicle 12 when either side thereof tends to assume a different lever than the opposite side. As will be explained in detail further in the description, the device 10 is securely mounted to, and depends from the bottom wall 14 of the vehicle chassis or frame and affixed to the rear axle 16.

The device 10 comprises a pair of substantially T-shaped plates 18 and 20 horizontally spaced apart. Each plate includes an integrally formed upper leg 22 and a lower leg 24. An intermediate leg 26 extends perpendicularly outward from the upper and lower legs 22, 24 and is centrally positioned with respect to their outer ends. Legs 22, 24 and 26 lie within the same vertical plane. An opening 27 (FIGS. 7 and 8) is formed at the point of intersection of the longitudinal center lines of the legs, the purpose of which will become apparent as the description proceeds.

Connecting members 28, 30 diagonally connect the T-plates 18 and 20. Thus, the connecting member 28 is connected between the upper leg 22 of plate 18 and the lower leg 24 of plate 20. The connecting member 30 is connected between the lower leg 24 of plate 18 and the upper leg 22 of plate 20. The connecting members 28, 30 cross at a point midway between the plates 18, 20. Each connecting member 28 and 30 diagonally connect the T-plates 18 and 20. Thus, the connecting member 28 is connected between the upper leg 22 of plate 18 and the lower leg 24 of plate 20. The connecting member 30 is connected between the lower leg 24 of plate 18 and the upper leg 22 of plate 20. The connecting members 28, 30 cross at a point midway between the plates 18, 20. Each connecting member 28 and 30 may include a spring 32 connected in series with a cable 34. A coupling means 36 pivotally connects the plates 18, 20 with the corresponding end of the connecting members 28, 30.

The coupling means includes a channel member 38 having a pair of end segments 40 integrally formed at the opposite ends of an intermediate segment 42. A pin 44 extends through apertures formed in the end segments 40 and the outer end of the corresponding upper or lower leg of one of the T-plates. The pin 44 is loosely secured in this position by cotter pins or other suitable means.

A ring 46 is secured to the intermediate segment 42 of the channel members 38 and extends outward therefrom. Thus, as may be seen in FIGS. 1 and 2, the ring members 46 either connect with the outer end of one of the springs 32 or with the outer end of the cable 34.

Arm members 48, 49 associate the bottom wall 16 of the vehicle frame with the T-plates 18, 20 Each arm member 48 and 49 comprises a rod 50 with a lower channel member 52 attached at the lower end and an upper channel member 53 attached at the upper end thereof. The outer end of the intermediate leg 26 is pivotally positioned inside the channel of the lower channel member 52. A pin 54 extends through apertures formed in the opposite sides of the lower channel member 52 and the corresponding intermediate leg 26 (FIG 4). The pin 54 is loosely secured to the channel member 52 and the intermediate leg to afford a pivotal association between the leg and the corresponding arm member.

A pair of T-mounting posts 56, 57 (FIGS. 1, 2 and 4) secure the arms 48, 49 to the bottom wall 16 of the vehicle frame. Each post comprises a rectangular upper flange 58 with a pair of spaced apertures 59 formed therein. A tongue 60 depends perpendicularly from the wall 58 at a point midway the lateral ends thereof. The tongue 60 is positioned within the upper channel member 53. A pin 62 extends through apertures formed in the upper channel member 53 and the tongue 60. The pin 62 is loosely secured to the channel member 53 and the tongue 60 to afford a pivotal association between the post and the corresponding arm member.

As shown in FIGS. 2 and 4, the posts 56, 57 are mounted to the bottom wall 16 of the vehicle frame by bolts 63 extending through the accommodating apertures 59. A saddle member 66 (FIGS. 1–3 and 6–8) is used to also secure the device 10 to the axle 16.

The saddle member 66 has a box-like configuration and comprises a pair of spaced apart end walls 68, 70 connected together by side walls 72, 74. The bottom edges 76 (FIGS. 1 and 7) of the side walls 72 are curved inwardly to afford a concave surface complementary with the convex outer surface of the axle 16. Thus, the bottom concave edges 26 of the side walls 72, 74 are positioned on the axle 16 and welded thereto at points 77 and 78 (see FIG. 7). Of course, other attachment means may be used, as for example, a U-bracket positioned over the axle and secured immovably in place by a pair of bolts.

A headed bolt member 80 pivotally associates the plates 18 and 20 with the corresponding saddle member 66. The bolt member 80 is threaded at the outer end 81 thereof and extends through the opening 27 in the T-plate and aligned apertures formed in the saddle end walls 68, 70. The bolt member 80 is secured to the saddle member 66 with a washer 82 and a nut 83 secured at the outer end 81. Plates 18 and 20 are pivotally connected to the saddle 66. The opening 27 within the plates 18, 20 is dimensioned with respect to bolt 80 to permit rotatable or pivotal movement of the plates about the bolt 80.

FIG. 5 illustrates another embodiment of the invention with similar parts indicated by like numerals with the added suffix "a." Thus, as shown, stabilizer 10a includes a pair of pulleys 88, 90 mounted on the differential housing 90' with bolts 91. For many vehicles the regular bolts of the differential housing may be used. The pulleys 88, 90 provide rolling surfaces respectively for the connecting members 28a, 30a and prevent the same from straying out of place with the movement of the vehicle. FIG. 5 further illustrates the rods 50a having an aperture 92 formed in the outer ends thereof. The apertures 92 afford means for connecting the rod directly to the bottom wall of vehicle chassis or with a mounting post arrangement, thereby pivotally associating the corresponding arm member 48a or 49a with the vehicle frame.

Referring now again to FIG. 2, it will be noted that a tensioning member 93 is connected between the upper legs 22 of the T-plates 18 and 20. Another tensioning member 94 is connected between the lower legs 24 of the plates 18 and 20. A linking member 95 pivotally associates the outer ends of the tensioning members 93, 94 to the corresponding legs. The tensioning members 93, 94 afford resistance vectors to the forces being exerted on the vehicle and thus function as shock absorbers. The tensioning members 93, 94 are particularly necessary when it is required to remove the shock absorbers of the vehicle for installing the device 10. In effect, they replace the original shock absorbers.

In FIG. 6, note that a linking member 95 is used instead of the channel member 38 of the first embodiment for coupling the connecting member to the T-plate. The outer end of either the spring 32 or cable 34 may be connected to the linking member 95 by means of the aperture 96. The linking member 95 is also pivotally associated with the T-plate 18 by the pin 44.

Referring now to FIGS. 1 and 2, the operation of the device will now be described when the right side of the vehicle has the tendency to rise to a non-stable position from a stable or normal position. Thus, in response to a vertical upward force acting on the right side of the vehicle, the arm 48 transmits the vertical force to the leg 26 of the T-plate 18, and thereby converts the same into a counterclockwise rotational force. Due to this rotational force, the lower leg pulls the connecting member 30 causing a clockwise force to act on plate 20. The clockwise rotational force in turn acts on the arm 49 which converts the clockwise rotational force into an upward vertical force and applies the same to the left side of the vehicle. Thus, the upward force on the left side of the vehicle counteracts or neutralizes the force on the right side of the vehicle without any appreciable movement of the component parts of the device 10. Hence, the device 10 affords a static force transmission system to prevent one side of the vehicle from assuming a different level than the opposite side thereof.

Turning now specifically to FIG. 5, the operation of the device will now be described when the left side of the vehicle has a tendency to rise to a different level than the right side. The dotted outline of parts indicate incremental movement which may occur in the operation of the device. If, for example, the left side of the vehicle has the tendency to lift away from the road due to a vertical force, the arm 49a also has the tendency to rise to the position shown in dotted outline, tending to cause the T-plate 20a to rotate in a clockwise direction to the position shown in dotted outline. Due to the clockwise rotational force, the lower leg 24a of plate 20a pulls on the connecting member 28a, causing a responsive counterclockwise rotational force in T-plate 18a, tending to rotate the same to the position shown in dotted outline. The counterclockwise force acting on plate 18 is converted to an upward vertical force now acting on the arm member 48a, tending to move the same to the upward position shown in dotted outline, thereby impressing an upward force on the right of the vehicle to neutralize the upward force on the left side of the vehicle.

Although the device 10, 10a operates primarily to maintain the stability of the vehicle without causing vertical movement of the vehicle frame, the device nevertheless has the capability to apply a counter-force causing one side of the vehicle to lift off the road which may occur, for example, when making a sharp turn. Thus, the counter-force would cooperate with the gravitational forces and bring the same back to the road. Moreover, the instantaneous action of the device also functions to minimize any such vertical displacement of one of the sides of the vehicle with respect to the other.

The device 10 operates in a similar manner when a downward directed force acts on one side of the vehicle, causing the same to tilt to a lower vertical level than the opposite side. In this condition, however, the device 10 functions to equalize or neutralize the force acting upon the vehicle, thereby distributing the force on both sides of the vehicle.

Thus, the device 10 or 10a of this invention comprises a first translating means for converting an upward or downward vertical force acting on either side of the vehicle to a first rotational force. A second translating means converts the first rotational force to a second rotational force opposite in direction to the first rotational force. A third translating means converts the second rotational force to an upward vertical force if the first mentioned vertical force acting on the vehicle is upward, or to a downward vertical force if the first mentioned vertical force acting on the vehicle is downward. The cooperation of the first, second and third translating means affords a device which automatically and instantly responds to any imbalance of forces on either side of the vehicle with respect to the opposite side; thereby either stabilizing or equalizing the forces acting on the vehicle.

When the device 10 or 10a functions as a vehicle stabilizer, the same affords an automatic safety means for maintaining or continually forcing the vehicle into or toward stable contact with the road. Thus, on sharp turns when one side of the vehicle tends to rise, the stabilizer reacts and pulls that side down.

The combination vehicle stabilizer and force equalizer of this invention may be provided as an auxiliary device attachment to the vehicle. However, it is also within the contemplation of the invention to afford the device as an integral part of the vehicle chassis.

It is believed that my invention, its mode of construction and assembly, and many of its advantages should be readily understood from the foregoing without further description, and it should also be manifest that while a preferred embodiment of the invention has been shown and described for illustrative purposes, the structural details are nevertheless capable of wide variation within the purview of my invention as defined in the appended claims.

What I claim and desire to secure by Letters Patent of the United States is:

1. In a combination vehicle stabilizer and force equalizer device, the herein improvement comprising: a first translating means for converting a first vertical force acting on one side of the vehicle to a first rotational force: a second translating means for converting said first rotational force to a second rotational force opposite in direction to said first rotational force; and a third translating means for converting said second rotational force to a second vertical force for applying the same against said opposite side of the vehicle, said second vertical force being in the same direction as said first vertical force for counteracting the effect of the same, said first translating means comprises a first rotating means associated with a first arm, said first arm being associated with said one side of the vehicle to convert said first vertical force to said first rotational force acting on said first rotating means; said second translating means comprises a second rotating means, said rotating means being associated with said first rotating means, said first rotating force acting on said first rotating means causing said second rotating force to act on said second rotating means; and said third translating means comprises a second arm associated with said second rotating means and associated with the opposite side of the vehicle, the cooperation of said second rotating means with said second arm converting the second rotational force to said second vertical force, each of said rotating means includes an upper leg and lower leg, said legs rotatable about a central pivot point; and said second translating means includes a connecting means comprising a first and second connecting member, said first connecting member being connected to the upper leg of the first rotating means and the lower leg of the second rotating means, said second connecting member being connected to the lower leg of the first rotating means and the upper leg of the second rotating means wherein each of said rotating means further includes an intermediate leg projecting from a point intermediate the ends of the upper and lower legs, each of said intermediate legs of said first and second rotating means being connected to said first and second arms respectively, the cooperation of the intermediate legs with the corresponding arms affording means for converting the rotational froces to vertical forces and vice versa, each of said rotating means includes mounting means for attaching the same to the rear axle of the vehicle.

2. The device of claim 1 wherein first and second guide pulleys are interposed between said rotating means, said first connecting member being supported on said first pulley and said second connecting member being supported on said second pulley.

3. The device of claim 1 wherein a first tensioning member is connected between the upper legs of said rotating means and a second tensioning member is connected between the lower legs of each of the rotating means.

4. The device of claim 1 wherein each of said arms having a lower end and an upper end, the lower end of said arms being connected to the corresponding intermediate leg of the rotating means and the upper ends of the arms being connected to the corresponding side of the vehicle.

5. The device of claim 4 wherein said mounting means includes a saddle member having at least one concave surface complementary with the convex surface of the axle, said saddle being joined to the axle.

6. The device of claim 1 wherein each of said arms is pivotally associated with the corresponding side of the vehicle and the corresponding intermediate leg of the rotating means, each of said connecting members being pivotally associated with the corresponding legs of the rotating means.

7. The device of claim 6 wherein:
each of said rotating means is substantially T-shaped, said intermediate leg being substantially perpendicular to the legs of the corresponding rotating means; and
each of said connecting members comprises a cable connected to a spring member.

References Cited

UNITED STATES PATENTS

| | | | |
|---|---|---|---|
| 3,353,839 | 11/1967 | Pistone | 280—104 |
| 2,815,202 | 12/1957 | Post | 267—11 |
| 1,297,325 | 3/1919 | Coleman | 267—11 |

PHILIP GOODMAN, *Primary Examiner.*